(12) United States Patent  
Todd et al.

(10) Patent No.: US 8,996,735 B2  
(45) Date of Patent: Mar. 31, 2015

(54) REMOTE DATA CONCENTRATOR

(75) Inventors: Timothy Todd, Bristol (GB); Thorsten Nitsche, Hamburg (DE)

(73) Assignees: Airbus Operations Limited, Bristol (GB); Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/821,315

(22) PCT Filed: Sep. 8, 2011

(86) PCT No.: PCT/EP2011/065579  
§ 371 (c)(1),  
(2), (4) Date: Mar. 7, 2013

(87) PCT Pub. No.: WO2012/038265  
PCT Pub. Date: Mar. 29, 2012

(65) Prior Publication Data  
US 2013/0173828 A1    Jul. 4, 2013

(30) Foreign Application Priority Data

Sep. 21, 2010    (GB) .................................. 1015756.8

(51) Int. Cl.  
G06F 3/00    (2006.01)  
G06F 5/00    (2006.01)  
G06F 13/38    (2006.01)  
G06F 3/06    (2006.01)  
H04L 29/08    (2006.01)  
H04L 12/40    (2006.01)

(52) U.S. Cl.  
CPC .............. *G06F 3/0659* (2013.01); *H04L 67/12* (2013.01); *H04L 67/125* (2013.01); *H04L 2012/4028* (2013.01)  
USPC .................................. 710/5; 710/36; 710/72

(58) Field of Classification Search  
None  
See application file for complete search history.

(56) References Cited

U.S. PATENT DOCUMENTS 8,391,788 B1 *    3/2013    Mazuk et al. ................ 455/41.2

FOREIGN PATENT DOCUMENTS

| EP | 1800216 A0 | 4/2006 |
|---|---|---|
| EP | 1860408 A1 | 11/2007 |
| EP | 2051044 A1 | 4/2009 |
| WO | 98/36335 A2 | 8/1998 |
| WO | 0223688 A2 | 3/2002 |
| WO | 2006007105 A2 | 1/2006 |

OTHER PUBLICATIONS

Search Report issued in Application No. GB1015756.8 on Jan. 7, 2011.  
Hosek, Martin: "Clustered-Architecture Motion control System Utilizing IEEE 1394b Communication Network", 2005 American Control Conference, Portland, OR, USA, Jun. 8-10, 2005, pp. 2939-2945.

(Continued)

*Primary Examiner* — Zachary K Huson  
(74) *Attorney, Agent, or Firm* — Lowe Hauptman & Ham, LLP

(57) ABSTRACT

A remote data concentrator (RDC) for an avionics network, the RDC comprising an input/output interface (I/O) for connection to one or more input/output devices, and a network interface for connection to a remote processor, wherein the RDC is operable to provide communication between the input/output device(s) and the remote processor, and wherein the RDC further comprises a set of instructions for autonomously driving an output device connected to the I/O. Also, an avionics network including the RDC; an aircraft including the RDC; and a method of operating the RDC.

27 Claims, 3 Drawing Sheets

(56) References Cited

OTHER PUBLICATIONS

XP-002667002—"Single Data Concentrator Requirements", Avionic Systems Standardisation Committee Packaging Systems Subcommittee, Issue No. 10, Nov. 1998.

International Search Report mailed Jan. 26, 2012 in International Application No. PCT/EP/2011/065579, filed Sep. 8, 2011.

Written Opinion mailed Jan. 26, 2012 in International Application No. PCT/EP/2011/065579, filed Sep. 8, 2011.

* cited by examiner

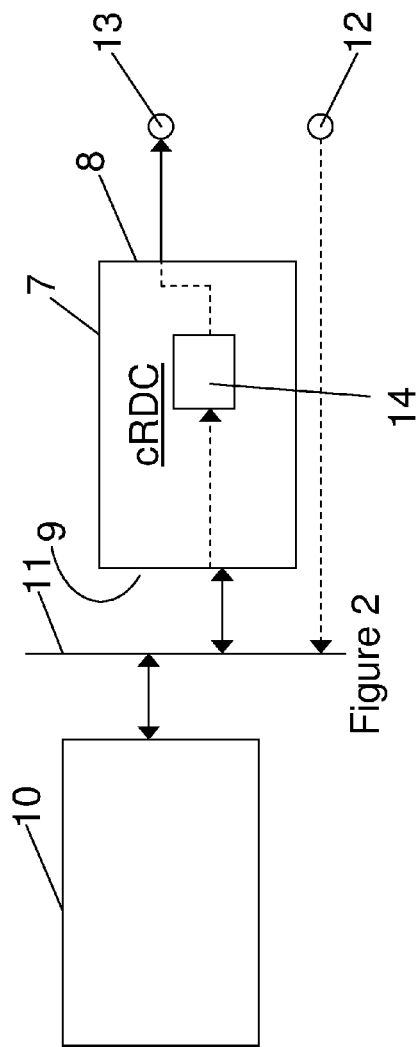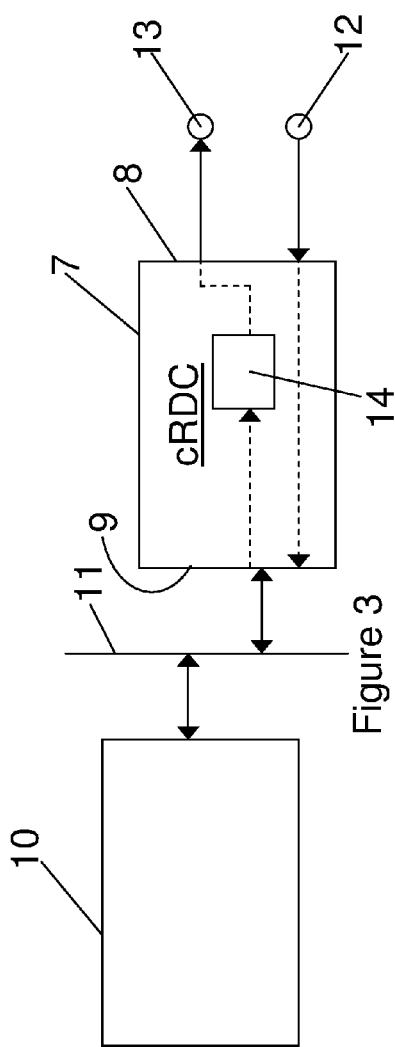

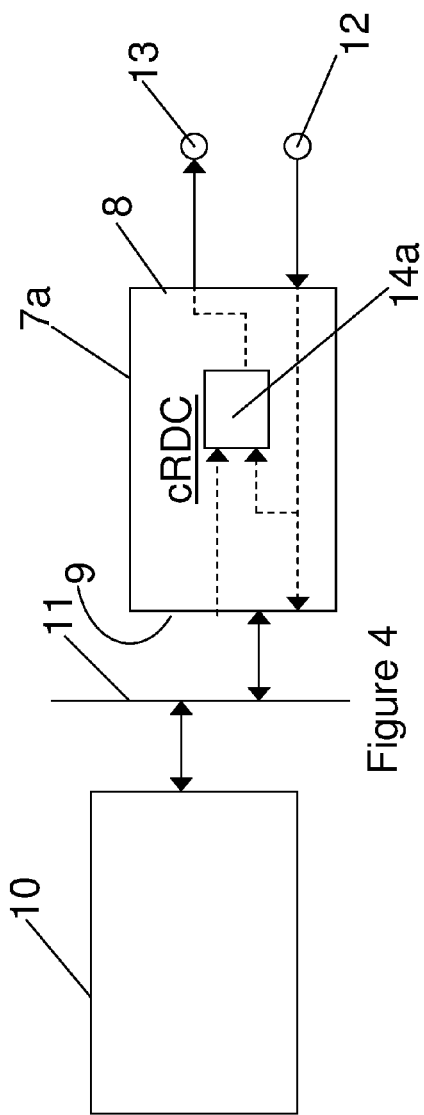
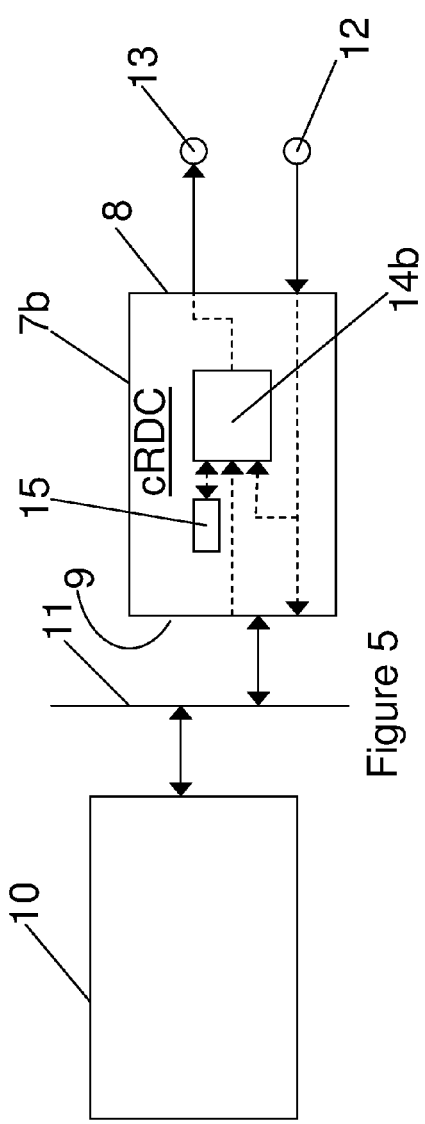

REMOTE DATA CONCENTRATOR

RELATED APPLICATIONS

The present application is a National Phase of PCT/EP2011/065579, filed Sep. 8, 2011 and is based on, and claims priority from, Great Britain Application No. 1015756.8, filed Sep. 21, 2010.

FIELD OF THE INVENTION

The present invention relates to a remote data concentrator (RDC) for an avionics network. Also, an avionics network including the RDC; an aircraft including the RDC; and a method of operating the RDC.

BACKGROUND OF THE INVENTION

Modern aircraft typically include a great number of sensors, effectors (e.g. actuators), etc., connected to an avionics network having one or more central processors. The sensors, effectors, etc. are typically line replaceable units (LRUs) to improve operational effectiveness. The LRUs are typically concentrated at particular locations in the aircraft where systems are installed. To reduce wiring, and therefore weight, a remote data concentrator (RDC) may be used to connect several of the LRUs to the avionics network.

To reduce design and manufacturing costs, and to improve operational effectiveness, all of the RDCs on a particular aircraft may be standardised, regardless of the LRUs to which they are connected. The RDCs may therefore have common hardware, and so are known as common remote data concentrators (cRDCs). The cRDCs may include configurable software. Standardisation of the cRDC makes it possible to hold an inventory of fewer parts, such that a defective cRDC can be readily replaced during routine maintenance tasks, thereby improving operational effectiveness.

During normal operation, a signal between the LRU and the remote processor may be routed via the RDC and over the avionics network. In the event of failure in transmitting the signal over this primary network, the LRU may additionally be connected to the remote processor via a secondary control system, avoiding the RDC and the primary network, so as to provide redundancy. This secondary control system adds additional complexity and weight, but is deemed necessary as the RDC is essentially a "dumb" data concentrator that simply converts one signal into another.

SUMMARY OF THE INVENTION

A first aspect of the invention provides remote data concentrator (RDC) for an avionics network, the RDC comprising an input/output interface (I/O) for connection to one or more input/output devices, and a network interface for connection to a remote processor, wherein the RDC is operable to provide communication between the input/output device(s) and the remote processor, and wherein the RDC further comprises a set of instructions for autonomously driving an output device connected to the I/O.

A further aspect of the invention provides a method of operating a remote data concentrator (RDC) in an avionics network, the RDC comprising an input/output interface (I/O) and a network interface, the RDC I/O being connected to an output device, the RDC network interface being connected to a remote processor via a network, and the RDC being operable to provide communication between the input/output device(s) and the remote processor, the method comprising using a set of instructions stored in the RDC to autonomously drive the output device.

The invention is advantageous in that the RDC is no longer a "dumb" data concentrator simply converting one signal into another, as in the prior art, but instead is interactive in controlling the output device. For example, the RDC can operate autonomously to drive the output device in the event of loss of (primary) command from the remote processor. This avoids the need for a redundant, secondary control system connecting the output device to the remote processor, which reduces complexity and saves considerable cost and weight. Furthermore, the RDC can assess the validity of the remote command and drive the output device according to the best available command resource, giving improved reliability, failure detection and redundancy.

The set of instructions may include a predetermined command for the output device.

The set of instructions may be configured to generate a command for the output device based upon a local input. The term "local input" is used here to refer to any input signal that the RDC receives that is not a remotely generated command for the output device. The RDC may receive the input signal from an input device connected either directly to the RDC I/O, or indirectly via the remote processor and the RDC network interface.

The output device may be connected in a closed control loop with the input device.

Often, the input device will be located adjacent the output device. For example, a pressure sensor (input device) may be located adjacent a valve (output device) whose position is dependent on a system pressure. Due to the proximity of the input and output devices, these may be connected to the I/O of the same RDC. Whereas the prior art remote data concentrators would simply pass the input signal to the remote processor over the network, the RDC can make good use of the input signal and generate the local command.

The set of instructions may be configured to compare the command generated by the remote processor with the local input, and generate a command for the output device if the local input and the remote command are in agreement. This configuration may be useful where verification of the remote command is required.

The set of instructions may be configured for autonomously driving the output device based upon a locally generated or stored command in priority over a remote command received from the remote processor. This configuration may be useful where the validity of the remote command is in doubt and the certainty of the command is insufficient for the output function to be safely performed. The local command may take priority in this instance and may be used to drive the output device to, e.g. one or more predetermined states. This may be useful where the remote processor has a lower design assurance level (DAL) than the RDC.

The set of instructions may be configured for autonomously driving the output device based upon a locally generated or stored command in the event of loss of the remote command. The local command may be used to drive the output device to, e.g. a default setting, or may be used as an instruction to the output device to continue with the last known valid command. This configuration provides a backup to cope with total loss of the remote (primary) command.

The set of instructions may be defined in reconfigurable software via a configuration table in the RDC. Reconfigurable software enables use of common RDC hardware to be connected to a variety of input/output devices. In this way, a common RDC, or cRDC, may be used throughout an aircraft, each configured depending on the input/output device(s) to which it is connected. The software may include logical, Boolean, and/or arithmetic operators.

The configuration table may be adapted to store one or more predetermined states for the output device, and the RDC may be adapted to generate the local command by interrogating the configuration table to select one of the predetermined states according to the input signal. The configuration table enables simple coding of the RDC software. The number of predetermined states may be far fewer than would ordinarily be provided under control of the remote processor and may, for example, be only sufficient to ensure safe operation of the output device. This reduces the complexity of the RDC software.

The RDC may be installed in an avionics network, with a remote processor connected to the RDC network interface via a network, and an output device connected to the RDC I/O. The avionics network may further include an input device connected to the remote processor via the network. The input device may be connected to the network through the RDC.

The RDC may be connected between an analogue, discrete or field bus (e.g. CAN, ARINC 429, FlexRay) on the network interface side, and an aircraft data network (e.g. ARINC 664, or any future aircraft data network) on the I/O side.

Also, an aircraft including the RDC, or the avionics network.

BRIEF DESCRIPTION OF THE DRAWINGS

Embodiments of the invention will now be described with reference to the accompanying drawings, in which:

FIG. 2 illustrates schematically a first embodiment of the avionics network including an RDC;

FIG. 3 illustrates schematically a second embodiment of the avionics network including an RDC;

FIG. 4 illustrates schematically a third embodiment of the avionics network including an RDC; and FIG. 5 illustrates schematically a fourth embodiment of the avionics network including an RDC.

DETAILED DESCRIPTION OF EMBODIMENT(S)

Figure 1:
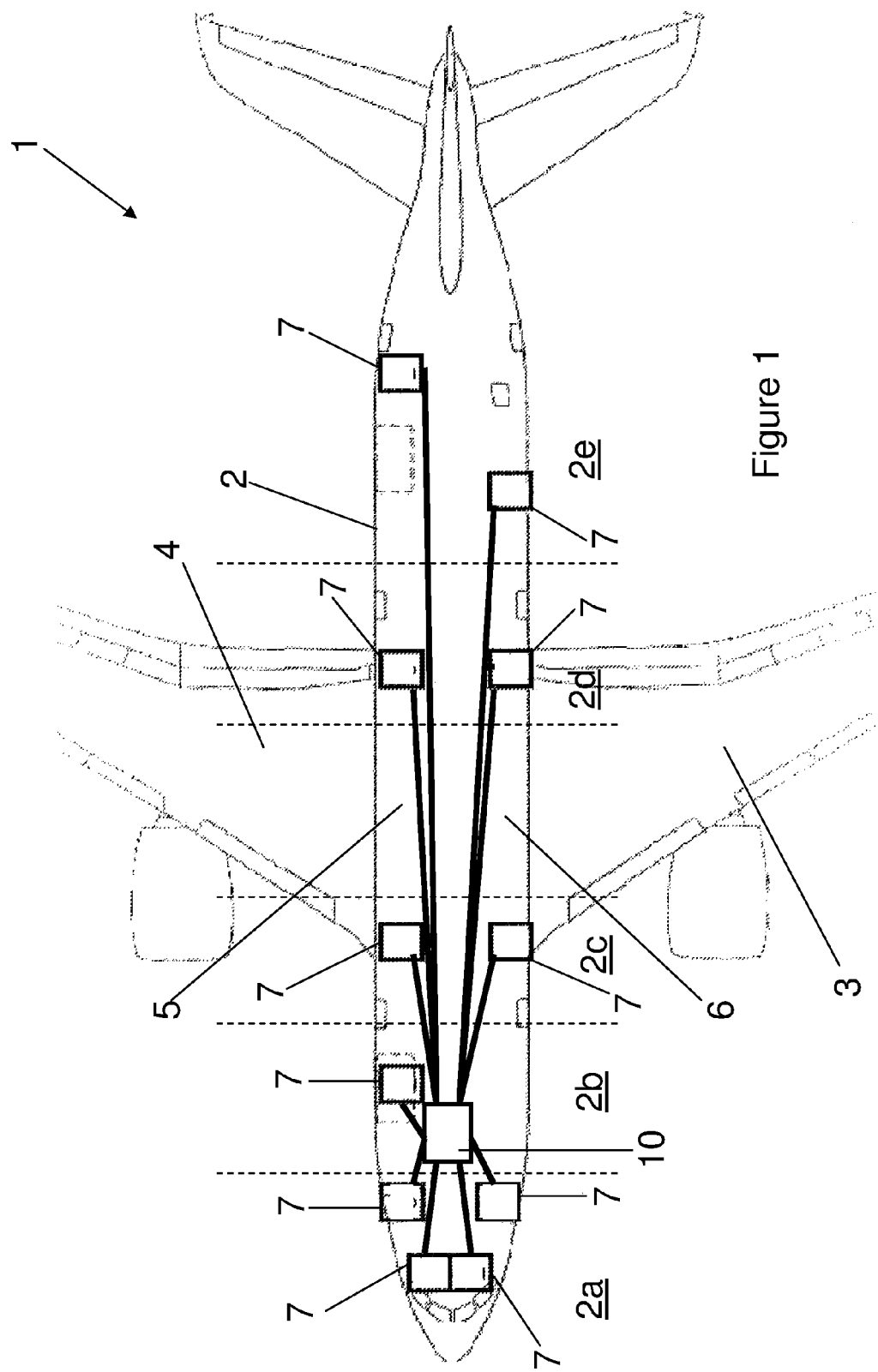
FIG. 1 illustrates schematically an avionics network installed in an aircraft.

FIG. 1 illustrates a plan view of an aircraft 1 having a fuselage 2, wings 3, 4 and an avionics network including two segregated wiring routes 5, 6 running along either side of the fuselage 2. The wire routes 5, 6 include power supplies, data buses, signal routes etc. The wire routes 5, 6 are grouped on first and second sides of the aircraft 1 to form first side wire routes 5 and second side wire routes 6. The first and second side wire routes 5, 6 are segregated to ensure that no single side failure affects the other.

The fuselage 2 is split into a plurality of segments:—nose fuselage 2a, forward fuselage to 2b, centre fuselage (forward of wingbox) 2c, centre fuselage (aft of wingbox) 2d, and aft fuselage 2e. In each of these fuselage segments there is located groups of common remote data concentrators (cRDCs) 7 on either side of the fuselage 2.

The location and grouping of the cRDCs 7 is dependent upon the location of various electronic sensors, effectors, etc. that need to be connected to the avionics network. The cRDCs 7 on the right side of the fuselage 2 are connected to wiring routes 5 and the cRDCs 7 on the left side of the fuselage 2 are connected to wiring routes 6.

FIG. 2 illustrates a first embodiment of the avionics network including a cRDC 7 having an input/output interface (I/O) 8 for connection to a plurality of input/output devices, which may be Line Replaceable Units (LRUs), and a network interface 9 for connection to a remote processor 10. The network interface 9 of the cRDC 7 is connected to the remote processor 10 over avionics network 11. The network 11 includes one or more data buses, e.g. CAN, ARINC 429 or FlexRay, that form part of the wiring routes 5, 6. The processor 10 is located in the forward fuselage 2b as shown in FIG. 1.

In FIG. 2, the avionics network includes an input device 12 and an output device 13. For example, the output device 13 may be a valve and the input device 12 may be a sensor for controlling the valve position. The output device is connected to the network 11 via the cRDC 7, and in particular is connected to the I/O 8 of the cRDC 7. The input device 12 is connected to the network 11 by an alternative means. For example, the input device 12 may be connected to the network 11 via another RDC, or cRDC. The input and output devices 12, 13 need not be adjacent in the aircraft.

Various input/output devices such as sensors, effectors, etc. may be connected to the I/O 8. The connections between the input/output devices and the I/O 8 are over an avionics network, such as defined in ARINC 664 for example, but may be any future aircraft data network. The cRDC 7 provides a portal between the data bus network 11 and the aircraft data network. It will be appreciated that the input and output devices 12, 13 described in this purely exemplary embodiment are used for illustrative purposes only and the cRDC 7 may be connected to a variety of input/output devices, such as sensors, effectors etc.

The cRDC 7 includes software 14. Under normal operating conditions the output device 13 is driven by a remote command generated at the remote processor 10 in response to an input signal from the input device 12. In the example where the output device 13 is a valve, the valve may be driven to one of several positions depending on the sensor input. The input signal is transmitted over the network 11 to the remote processor 10. The remote processor 10 processes this input signal and returns a command destined for the output device 13. This command is transmitted from the remote processor 10 over the network 11 to the network interface 9 of the cRDC 7 and to the software 14. The software module 14 may include conditional logical operators, such that if it judges that a valid command has been received from the remote processor 10 for driving the output device 13 then it forwards that command to the output device 13.

However, in the event that the cRDC 7 loses its primary command from the remote processor 10 then the software 14 will not receive a valid command from the remote processor 10. In this case, the cRDC 7 itself assumes control of the output device 13. The software 14 has stored therein a predetermined default state for the output device 13.

For example, the software 14 may include the following conditional statement:

```
IF ( AFDX_MESS_VALVE_POSITION = = VALID ) THEN
    DSO_1 = AFDX_MESS_VALVE_POSITION
ELSE
    DSO_1 = 28V
ENDIF
```

If the cRDC 7 receives a valid command for the output device 13, which in this case a valve position message, from the remote processor 10 over the data bus network 11 then this command is delivered to I/O 8 (here DSO_1) to drive the output device 13 connected thereto. If the cRDC 7 loses communication with the remote processor 10, or an invalid message is received, then the software 14 delivers a predetermined "Voltage=HIGH" state to the I/O 8 to drive the output device 13 to a predetermined position. In the particular example above, the default position for the valve is valve "OPEN". The predetermined state will depend on the output device and so it is expected that a variety of predetermined states can be stored in the software 14. The software 14 is conditional in that the cRDC 7 will drive the output device 13 based upon the primary command from the remote processor 10 at all times unless that primary command is lost. Only then will the cRDC 7 drive the output device 13 autonomously to the stored predetermined state.

Since the cRDC 7 may be connected to a plurality of output devices 13, the software 14 may store a plurality of predetermined states, one for each of the output devices 13. In this way, the cRDC 7 may autonomously drive a plurality of output devices 13 in the event that primary command from the remote processor 10 is lost.

FIG. 3 illustrates a second embodiment of the avionics network in which like reference numerals have been used to denote like parts with the first embodiment. The only difference is that in the second embodiment shown in FIG. 3, cRDC 7 has both the input device 12 and the output device 13 connected to the I/O 8.

Operation of the software 14 to control the output device 13 is effected in exactly the same way as for the first embodiment described above with reference to FIG. 2. As mentioned previously, the design of the cRDC 7 is such that a variety of input and output devices 12, 13 may be connected to the I/O 8.

FIGS. 2 and 3 together illustrate that it does not matter whether the input device 12 and output device 13 are connected to the same cRDC 7, since there is no internal connection within the cRDC 7 between the signals to/from the input device 12 and the output device 13.

FIG. 4 illustrates a third embodiment of the avionics network, which includes a more complex version of the cRDC 7a, and in which like reference numerals have been used to denote like parts with the first embodiment.

In FIG. 4, the input device 12 is connected to the I/O 8 of cRDC 7a, and the output device 13 is also connected to the I/O 8 of cRDC 7a. The cRDC 7a features two important differences with respect to the cRDC 7 described above. Firstly, the cRDC 7a includes software 14a including combinatorial logic. Secondly, the software 14a is adapted to receive the input signal from the input device 12. Otherwise, the cRDC 7a is substantially identical to the cRDC 7 described above and so only the differences between them will be described in the following.

The software 14a receives two inputs. The first logic input is the remote command for the output device generated at the remote processor 10 in an identical way to that described above with reference to FIG. 3. The second logic input is the input signal from the input device 12. Note that this input signal is also transferred to the remote processor 10 over network 11 in the same way as before. The software 14a stores a set of instructions for converting this input signal into a local command. The set of instructions may be similar to those used by the remote processor 10 for generating the remote command. Alternatively, the set of instructions for generating the local command at the software 14a may be a simplified version of those used by the remote processor 10. Using the same example given above, where the output device 13 is a valve and the input device 12 is a sensor for controlling the valve position, it will be appreciated that a simplified version of the instructions may include a limited number of predetermined positions for the valve each according to a range of values for the sensor input.

During normal operation of the avionics network, the software 14a is configured to compare the remote command generated by the remote processor and the local command, and drive the output device 13 according to the remote command if the local command and the remote command are in agreement. This configuration enables verification and cross-checking of the command signals for improved safety, reducing probability of erroneous operation.

The software 14a may alternatively, or additionally, be configured such that the cRDC 7a drives the output device 13 based upon the local command in priority over the remote command. This configuration is useful where the validity of the remote command is in doubt and the certainty of the remote command is insufficient for the output function to be safely performed based upon the remote command. The local command may take priority in this instance and may be used to drive the output device 13.

The software 14a may alternatively, or additionally, be configured such that in the event of loss of command from the remote processor 10, then the software 14a delivers a predetermined state to the I/O 8 so as to drive the output device 13 to a predetermined position in the same way as described above with reference to FIG. 2.

FIG. 5 illustrates a fourth embodiment of the avionics network, in which the cRDC 7b includes software 14b having a look up table 15. In all other respects the cRDC 7b is substantially identical to the cRDC 7a described above and so only the differences between them will be described in the following. Like reference numerals have been used to denote like parts with the third embodiment.

The software 14b contains a shortened set of instructions for driving the output device 13, as compared to the software 14a, and the look up table 15 has stored therein a set of local commands for driving the output device depending on the status of the remote command and/or the local input. The software 14b is operable to perform at least the same functions as the software 14a but the software 14b is simplified as it does not store the set of local commands. The software 14b therefore contains fewer instructions and is easier to test. Moreover, by storing the local commands in the look up table 15, a greater number of predetermined states for the output device can be easily provided.

The software 14b accesses the look up table 15 and selects one of the plurality of predetermined states for the output device 13 according to the remote command and/or the local input as appropriate. Having selected the appropriate predetermined state, the cRDC 7b drives the output device 13 to the selected predetermined state. In this way, the cRDC 7b is operable to drive the output device 13 to one of a plurality of predetermined states. Generally, the cRDC 7b cannot provide a full level of control of the output device 13 as would normally be provided by remote processor 10, but a much greater level of granularity in the control of output device 13 can be achieved as compared to the embodiments described above with reference to FIG. 4. This is achieved with only a minor increase in complexity over the cRDC 7a described previously.

As an example of how the fourth embodiment may be employed, the input device 12 may be an aircraft cabin temperature sensor, and the output device 13 may be an aircraft cabin air conditioning unit temperature controller. The software 14b of the cRDC 7b may have stored in the look up table 15 a plurality of discrete settings for the temperature controller. For example, the look up table 15 may store three settings—"Low", "Medium" and "High". If the input signal from the temperature sensor 12 indicates a cabin temperature above a predetermined threshold, then the cRDC 7b drives the temperature controller to the low setting. If the cabin temperature sensor 12 indicates a cabin temperature below a predetermined minimum threshold temperature then the cRDC 7b can drive the temperature controller 13 to the "High" setting. If the cabin temperature sensor 12 indicates a cabin temperature between maximum and minimum threshold temperatures then the cRDC 7b may drive the temperature controller 13 to the "Medium" setting. If the cabin temperature sensor 12 indicates a cabin temperature above a predetermined maximum threshold temperature then the cRDC 7b can drive the temperature controller 13 to the "Low" setting.

As can be seen from the above, the RDC in accordance with this invention can provide autonomous control of one or more output devices connected to it in the event of an invalid, or even total loss of, primary command for that output device from the remote processor. This degree of control does away with the requirement for a secondary control system for controlling the output device in the event of loss of command to the RDC from the remote processor. The invention also makes it possible to provide the RDC with functionality to have fully autonomous control over one or more output devices connected to it without the need for any command from the remote processor under normal operation.

Whilst in the specific embodiments described above the RDC is a cRDC, it will be appreciated that, where desired, each RDC in the avionics network may be different.

The software may be reconfigurable, e.g. via an update of the configuration table software. This provides flexibility for exchange or replacement of the cRDCs for any purpose.

Although the invention has been described above with reference to one or more preferred embodiments, it will be appreciated that various changes or modifications may be made without departing from the scope of the invention as defined in the appended claims.

The invention claimed is:

1. A remote data concentrator (RDC) for an avionics network, the RDC comprising an input/output interface (I/O) for connection to one or more input/output devices, and a network interface for connection to a remote processor, wherein the RDC is operable to provide communication between the input/output device(s) and the remote processor, and wherein the RDC further comprises a set of instructions for autonomously driving an output device connected to the I/O.

2. A RDC according to claim 1, wherein the set of instructions includes a predetermined command for the output device.

3. A RDC according to claim 1, wherein the set of instructions is configured to generate a command for the output device based upon a local input.

4. A RDC according to claim 3, wherein the set of instructions is configured to compare a command generated by the remote processor with the local input, and generate a command for the output device if the local input and the remote command are in agreement.

5. A RDC according to claim 1, wherein the set of instructions is configured for autonomously driving the output device based upon a locally generated or stored command in priority over a remote command received from the remote processor.

6. A RDC according to claim 1, wherein the set of instructions is configured for autonomously driving the output device based upon a locally generated or stored command in the event of loss of the remote command.

7. A RDC according to claim 1, wherein the set of instructions is defined in reconfigurable software via a configuration table in the RDC.

8. An avionics network comprising a RDC in accordance with claim 1, a remote processor connected to the RDC network interface via a network, and an output device connected to the RDC I/O.

9. An avionics network according to claim 8, further comprising an input device connected to the remote processor via the network.

10. An avionics network according to claim 9, wherein the input device is connected to the network through the RDC.

11. An aircraft including the RDC of claim 1.

12. An aircraft including the avionics network of claim 8.

13. A method of operating a remote data concentrator (RDC) in an avionics network, the RDC comprising an input/output interface (I/O) and a network interface, the RDC I/O being connected to an output device, the RDC network interface being connected to a remote processor via a network, and the RDC being operable to provide communication between the input/output device(s) and the remote processor, the method comprising using a set of instructions stored in the RDC to autonomously drive the output device.

14. A method according to claim 13, in which the set of instructions compares a command generated by the remote processor with a local input, and generates a command for the output device if the local input and the remote command are in agreement.

15. A method according to claim 13, further comprising autonomously driving the output device based upon a locally generated or stored command in priority over a remote command received from the remote processor.

16. A method according to claim 13, further comprising autonomously driving the output device based upon a locally generated or stored command in the event of loss of the remote command.

17. A method according to claim 13, further comprising autonomously driving the output device according to a predetermined command stored in the RDC.

18. A method according to claim 13, further comprising autonomously driving the output device according to a command generated by the RDC based upon a local input.

19. A method according to claim 13, in which the RDC generates the command by interrogating a configuration table, which stores one or more predetermined states for the output device, and selects one of the predetermined states for the output device according to the input signal.

20. A RDC according to claim 1, wherein the RDC is operable to provide communications for driving an output device connected to the I/O according to a remote command generated by the remote processor.

21. A RDC according to claim 20, wherein, in the event of loss of the remote command, the RDC is operable to process said set of instructions to autonomously drive said output device connected to the I/O.

22. A RDC according to claim 20, wherein, in the event where the remote command is judged to be invalid, the RDC is operable to process said set of instructions to autonomously drive said output device connected to the I/O.

23. A method according to claim 13, wherein the RDC provides communications to drive an output device connected to the I/O according to a remote command generated by the remote processor.

24. A method according to claim 23, wherein, in the event of loss of the remote command, the RDC processes said set of instructions to autonomously drive said output device connected to the I/O.

25. A RDC according to claim 20, wherein, in the event where the remote command is judged to be invalid, the RDC processes said set of instructions to autonomously drive said output device connected to the I/O.

26. A remote data concentrator (RDC) according to claim 1, wherein the RDC is located remote from the remote processor.

27. A method of operating a remote data concentrator (RDC) according to claim 13, wherein the RDC is located remote from the remote processor.

* * * * *